United States Patent
Iwashita et al.

(10) Patent No.: US 7,843,152 B2
(45) Date of Patent: Nov. 30, 2010

(54) MOTOR CONTROL APPARATUS

(75) Inventors: Yasusuke Iwashita, Yamanashi (JP); Tadashi Okita, Yamanashi (JP); Hiroyuki Kawamura, Yamanashi (JP); Satoshi Ikai, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 526 days.

(21) Appl. No.: 11/938,055

(22) Filed: Nov. 9, 2007

(65) Prior Publication Data
US 2008/0116831 A1 May 22, 2008

(30) Foreign Application Priority Data
Nov. 20, 2006 (JP) .............................. 2006-313229

(51) Int. Cl.
*H02P 5/00* (2006.01)
(52) U.S. Cl. ..................... 318/106; 318/105; 318/109; 318/452; 318/490; 318/567; 318/569; 318/600; 340/648
(58) Field of Classification Search ................. 318/105, 318/106, 109, 452, 490, 567, 569, 600; 340/648
See application file for complete search history.

(56) References Cited

U.S. PATENT DOCUMENTS

| | | | | | |
|---|---|---|---|---|---|
| 4,777,420 | A | * | 10/1988 | Dadpey et al. | ............... 318/758 |
| 4,965,463 | A | * | 10/1990 | Maruyama et al. | ............ 307/87 |
| 5,473,225 | A | * | 12/1995 | Miyazaki | ..................... 318/52 |
| 7,277,304 | B2 | * | 10/2007 | Stancu et al. | .................. 363/71 |

FOREIGN PATENT DOCUMENTS

| EP | 0832779 A | | 4/1998 |
|---|---|---|---|
| JP | 60035964 A | * | 2/1985 |
| JP | 2005-086918 A | | 3/2005 |

OTHER PUBLICATIONS

Extended Search Report for EPA-103 479 dated May 2, 2008.

* cited by examiner

*Primary Examiner*—Walter Benson
*Assistant Examiner*—Kawing Chan
(74) *Attorney, Agent, or Firm*—Lowe, Hauptman, Ham & Berner, LLP

(57) ABSTRACT

A motor control apparatus comprises a control processing unit (3) creating a motor drive command, power supply processing units (2A to 2D) supplying a driving voltage to a motor, and a signal relay processing unit (4) supplying the motor drive command received from unit (3) to power supply processing units (2A to 2D). Control processing unit (3) transmits a preparation request flag to power supply processing units (2A to 2D) via signal relay processing unit (4), which includes a preparation complete flag register storing preparation complete flags each transmitted from each of power supply processing units (2A to 2D) to indicate the completion of preparation for supplying power to the motor, and transmits a preparation complete flag enabled state to control processing unit (3) if contents of the preparation complete flag register indicate that the preparation is completed in all units (2A to 2D).

12 Claims, 19 Drawing Sheets

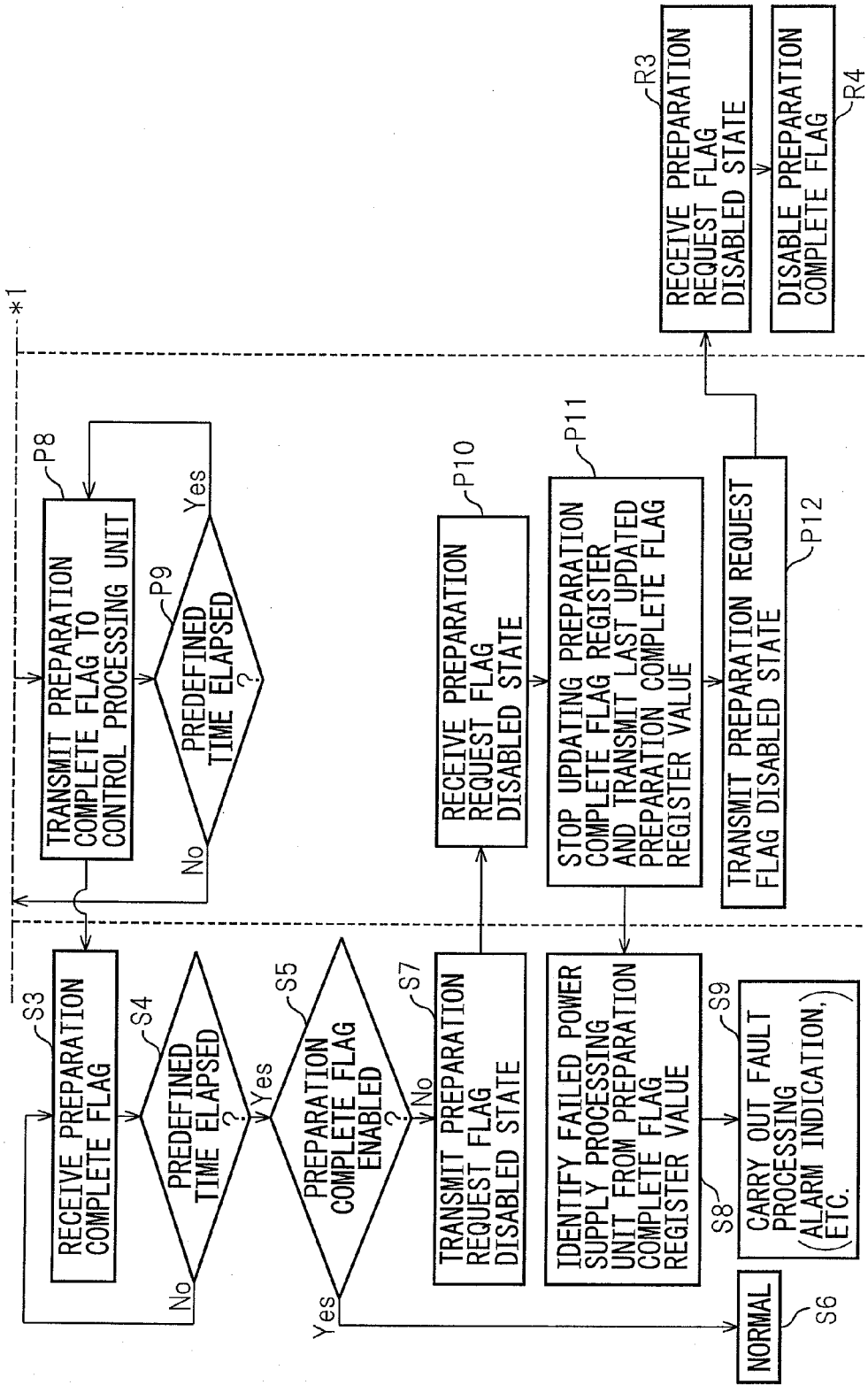

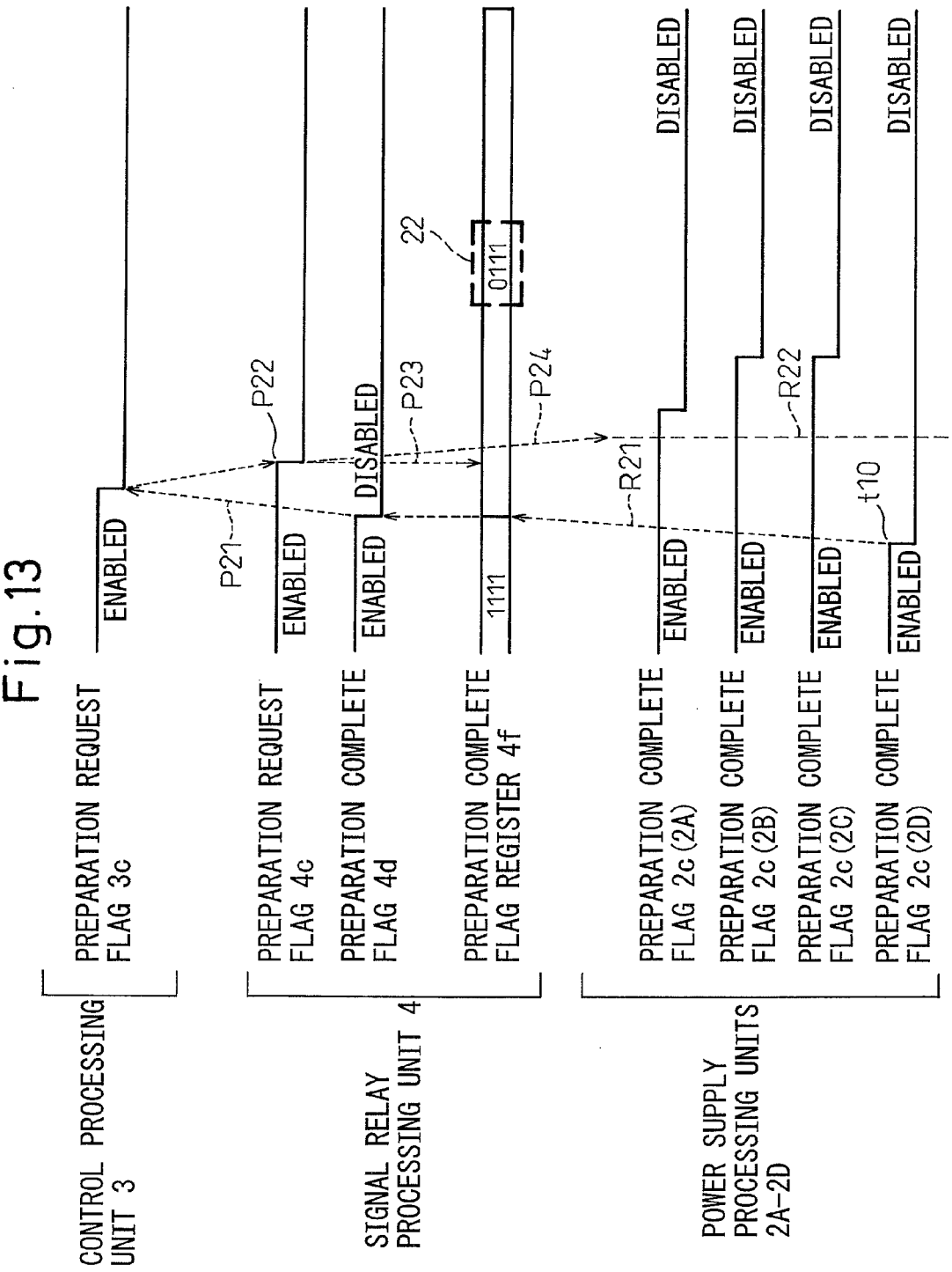

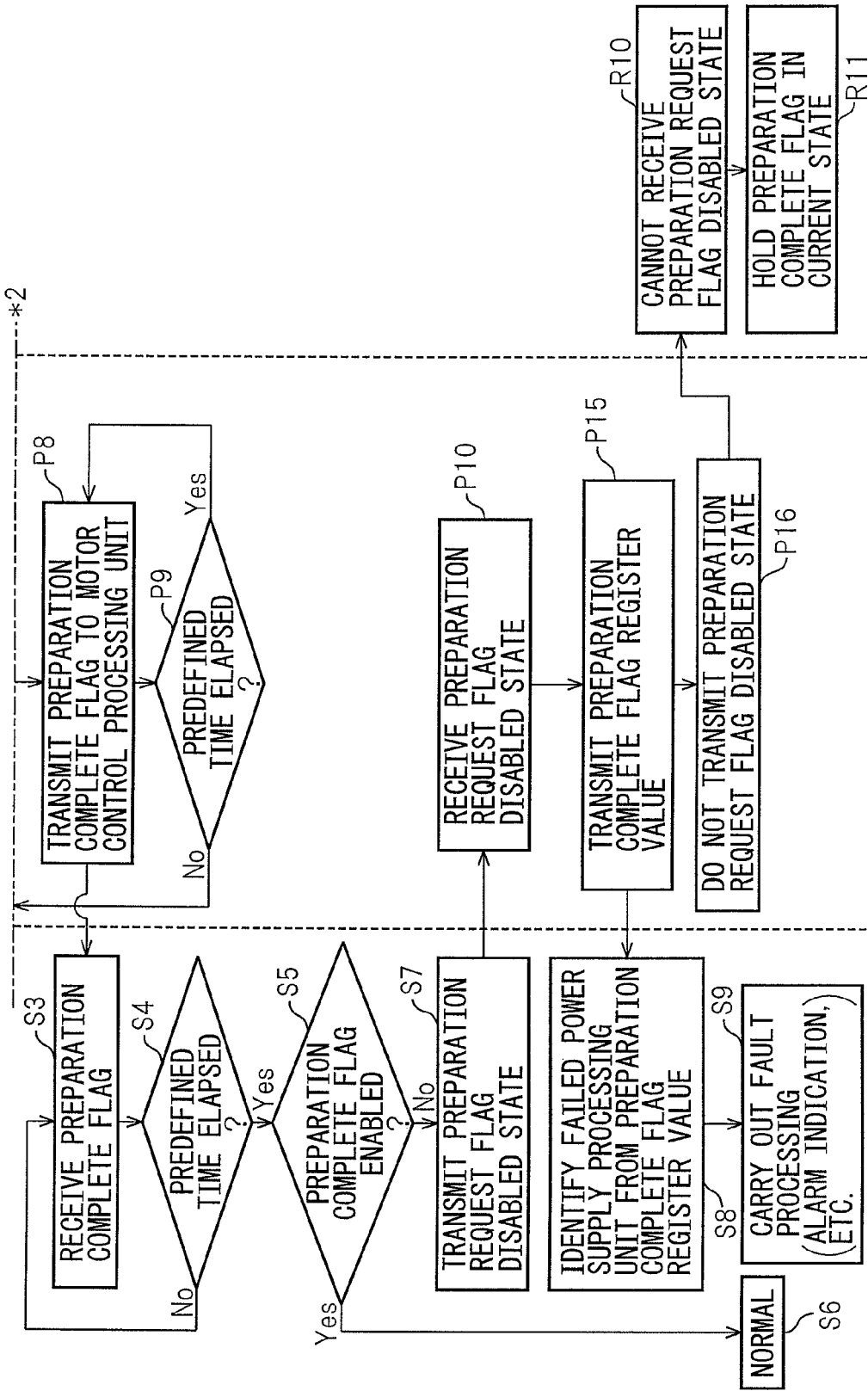

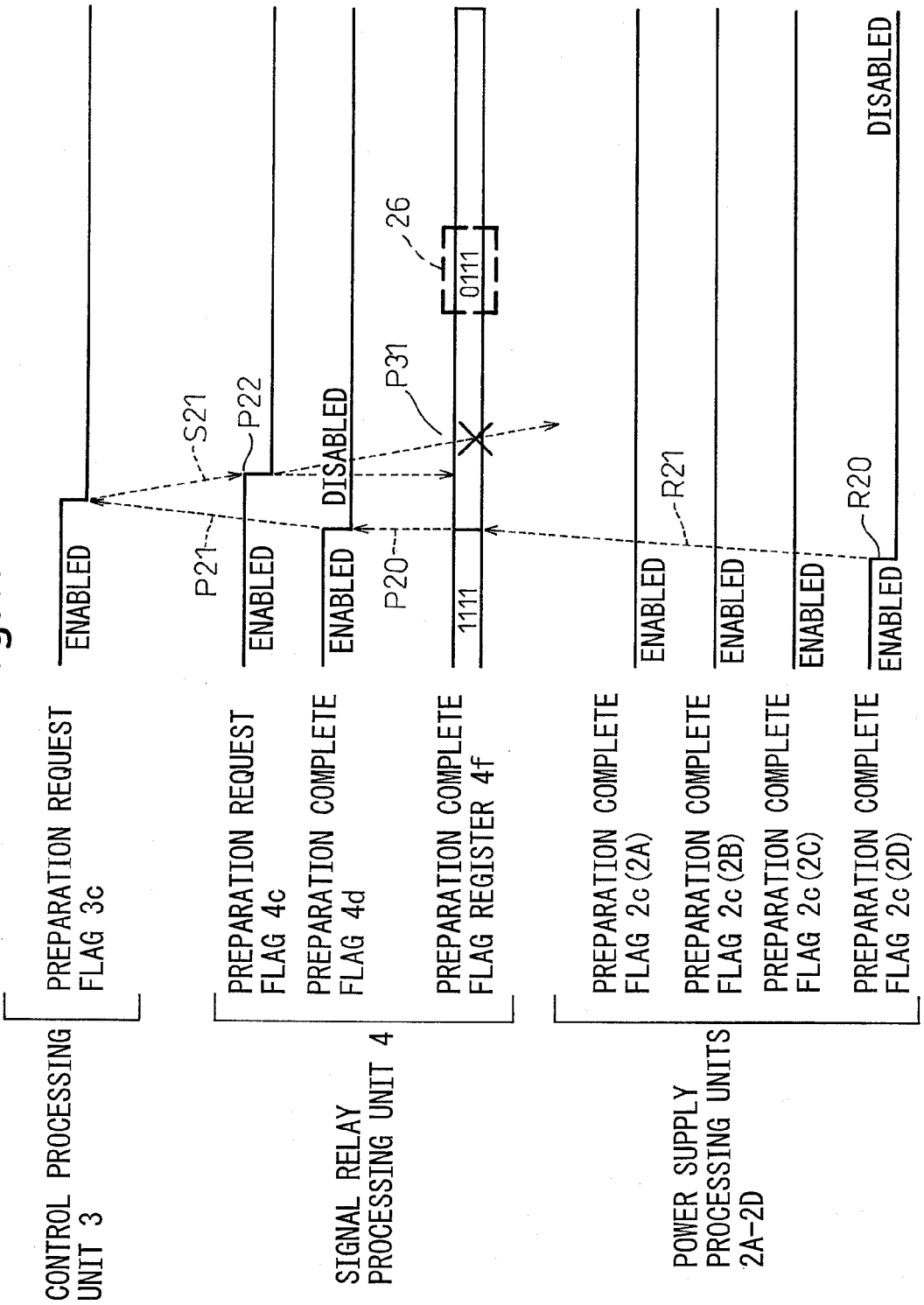

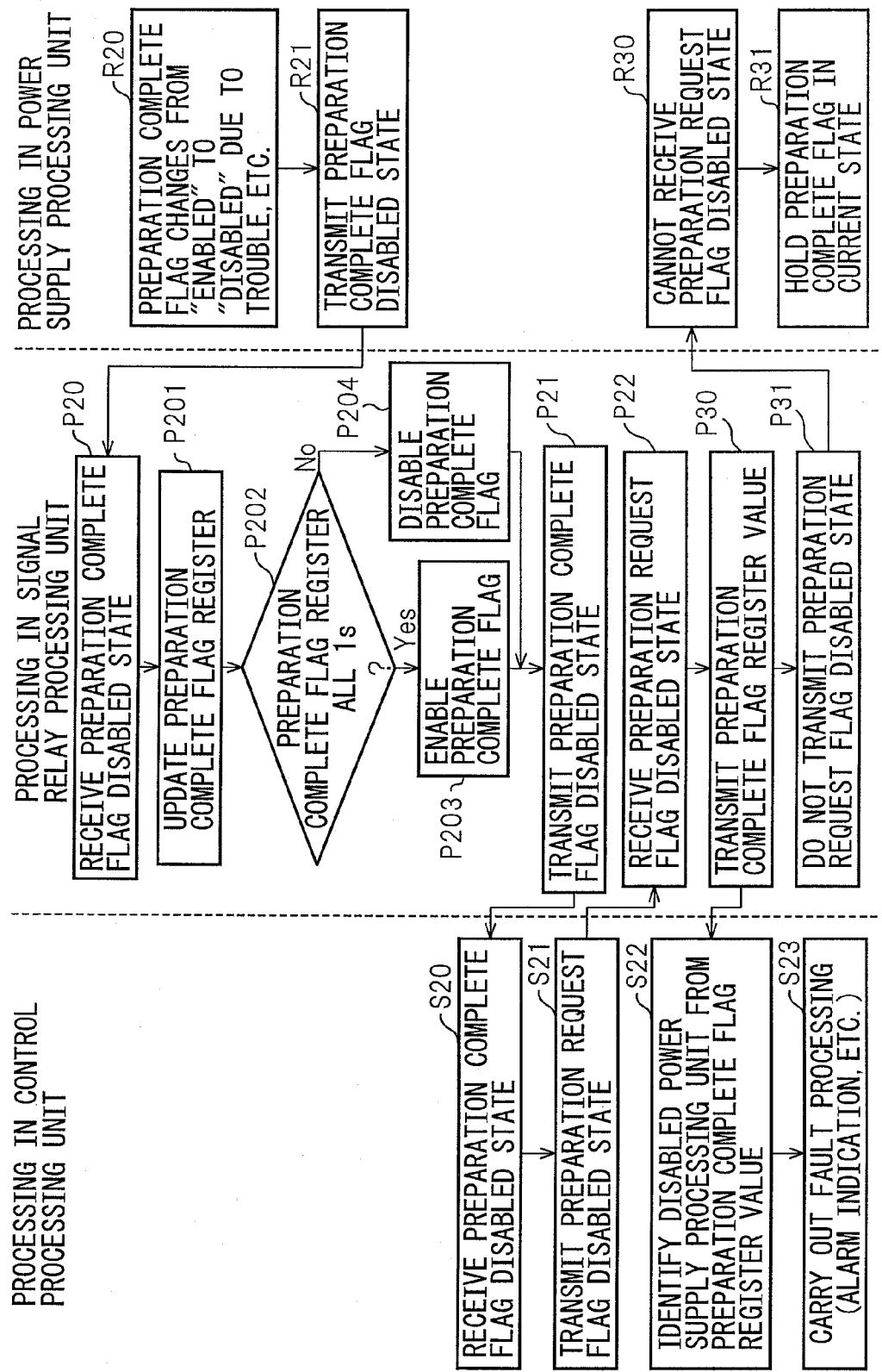

US 7,843,152 B2

MOTOR CONTROL APPARATUS

CROSS-REFERENCE TO RELATED APPLICATION

This application claims priority from Japanese Patent Application No. 2006-313229, filed on Nov. 20, 2006.

TECHNICAL FIELD OF THE INVENTION

The present invention relates to a motor control apparatus that supplies power to a high-output motor by using a plurality of power supply processing units.

BACKGROUND OF THE ART

When generating power for driving a high-output motor by means of a power supply processing unit such as an inverter unit, it is necessary to provide a large-capacity power supply processing unit. However, such a large-capacity power supply processing unit has the following problems: 1) increased housing size 2) since the unit is often a custom-designed product, development cost is higher than when using a general-purpose power supply processing unit, and 3) increased maintenance cost.

In view of the above problems, it has been proposed, as shown in FIG. 1, to construct the windings of a high-output motor 1 from a plurality of electrically independent three-phase windings and connect a plurality of general-purpose power supply processing units 2 (2A, 2B, 2C, and 2D) to the respective three-phase windings to drive high-output motor 1. Since this configuration not only reduces the volume of each individual power supply processing unit, but also permits the use of general-purpose power supply processing units, development and maintenance costs can be reduced. However, the configuration of FIG. 1, has the disadvantage that the number of motors that can be connected to control processing unit 3 is limited. This is due a limit of the number of power supply processing units 2 that can be connected to control processing unit (CNC) 3.

FIG. 2 shows a motor control apparatus as proposed in Japanese Unexamined Patent Publication No. 2005-86918 to overcome the above disadvantage. In this apparatus, one signal relay processing unit (PDM) 4 is provided between control processing unit 3 and the plurality of power supply processing units 2 (2A, 2B, 2C, and 2D), and a motor drive command from control processing unit 3 is supplied to the plurality of power supply processing units 2 in a parallel fashion via signal relay processing unit 4. With this configuration, since signal relay processing unit (PDM) 4 can be handled as though it were one power supply processing unit, it is possible to connect a plurality of signal relay processing units 4 to control processing unit 3 and drive a large number of motors under the control of control processing unit 3. This solves the problem associated with the apparatus of FIG. 1, i.e., a limited number of motors that can be connected to it.

FIG. 3 is a diagram showing a signal control system in a motor control apparatus of the type shown in FIG. 1 in which motor control processing unit 3 is directly connected to power supply processing units 2. As shown, control processing unit 3 includes a receiving part 3a, a transmitting part 3b, and a preparation request flag 3c, and each power supply processing unit 2 includes a receiving part 2a, a transmitting part 2b, and a preparation complete flag 2c. When power supply processing unit 2 starts preparation for driving the motor, control processing unit 3 enables the preparation request flag. When the preparation for supplying power to the motor is completed, power supply processing unit 2 enables preparation complete flag 2c. The enabled or disabled state of preparation request flag 3c is transmitted via its transmitting part 3c to receiving part 2a of power supply processing unit 2. The enabled or disabled state of preparation complete flag 2c in supply processing unit 2 is transmitted via its transmitting part 2c to receiving part 3a of control processing unit 3.

FIGS. 4 and 5 are time charts illustrating the operation of the apparatus shown in FIG. 3. As shown in FIG. 4, control processing unit 3 at time T1 changes the state of preparation request flag 3c from disabled to enabled and transmits the preparation request flag enabled state to power supply processing unit 2, whereupon power supply processing unit 2 starts preparation for supplying power to the motor, and transmits the preparation complete flag enabled state to control processing unit 3 upon completion of the preparation (time T2). When control processing unit 3 receives the preparation complete flag enabled state from power supply processing unit 2 within a predefined time interval (T1 to T3), for example, within several seconds, control processing unit 3 outputs a motor drive command by determining that power supply processing unit 2 has completed the preparation for driving the motor. In order to effect the supply of power from power supply processing unit 2 to the motor, not only the condition that the motor drive command is received, but also other conditions, including the condition that an emergency stop signal (alarm) for stopping power supply processing unit 2 is disabled, must be satisfied.

On the other hand, if power supply processing unit 2 fails, in order to complete the preparation for supplying power to the motor in response to the preparation request flag enabled state transmitted from control processing unit 3, preparation complete flag 2c in power supply processing unit 2 continues to be held in the disabled state, as shown in FIG. 5. As a result, control processing unit 3 cannot receive the preparation complete flag enabled state within the predefined time interval, and therefore, at time T3 control processing unit 3 transmits the preparation request flag disabled state to power supply processing unit 2, causing power supply processing unit 2 to stop the preparation for driving the motor, and subsequently carries out alarm processing.

However, when the flag control shown in FIGS. 3 to 5 is applied to the motor control apparatus of the type shown in FIG. 2, the following problem occurs.

FIG. 6 is a block diagram showing the configuration when the flag control described above with reference to FIGS. 3 to 5 is applied to the motor control apparatus of the type shown in FIG. 2. As shown, signal relay processing unit 4 includes: a preparation request flag 4c which is enabled or disabled depending on the state of preparation request flag 3c received from control processing unit 3; a preparation complete flag register 4f which stores preparation complete flags 2c (2A to 2D) received from respective power supply processing units 2A to 2D; and a preparation complete flag 4d which is enabled or disabled according to the contents of preparation complete flag register 4f, that is, according to whether all the preparation complete flags from the respective power supply processing units 2A to 2D are enabled or not. Preparation complete flag register 4f is, for example, a four-bit register when four power supply processing units 2A to 2D are connected to signal relay processing unit 4, and each bit is set to a 1 or a 0 according to whether preparation complete flag 2c from a corresponding one of the power supply processing units is enabled or disabled.

Preparation complete flag 4d in signal relay processing unit 4 is enabled when the value of preparation complete flag register 4f is "1111", i.e., when all the preparation complete flags received from the respective power supply processing units are in enabled state. On the other hand, when the value of preparation complete flag register 4f is not "1111", i.e., when the preparation complete flag received from any one of the power supply processing unit is not in enabled state, preparation complete flag 4d is disabled. In signal relay processing unit 4, reference numeral 4a indicates a receiving part which receives the preparation request flag from control processing unit 3 and the preparation complete flags from the respective power supply processing units 2A to 2D, and 4b designates a transmitting part which transmits the state of preparation request flag 4c to power supply processing units 2A to 2D and the state of preparation complete flag 4d to control processing unit 3.

The operation of the apparatus shown in FIG. 6 and the problem associated with it will be described with reference to the time charts of FIGS. 7 and 8. As shown in FIG. 7, when preparation request flag 3c in control processing unit 3 changes from disabled to enabled at time T1, the preparation request flag enabled state is transmitted to signal relay processing unit 4, and preparation request flag 4c changes from disabled to enabled. This change of state is transmitted to the respective power supply processing units 2A to 2D in a parallel fashion, causing the power supply processing units to start preparation for driving the motor. Power supply processing units 2A, 2B, and 2C that have completed the preparation for supplying power to the motor change their preparation complete flags 2c (2A), 2c (2B), and 2c (2C) from disabled to enabled upon completion of the preparation (T4 and T5).

On the other hand, power supply processing unit 2D has failed to complete the power supply preparation due to some kind of trouble, and therefore, its preparation complete flag 2c (2D) continues to be held in the disabled state. As a result, the value of preparation complete flag register 4f in signal relay processing unit 4 does not change to "1111", and preparation complete flag 4d cannot change to the enabled state. Since control processing unit 3 is not able to receive the enable signal of preparation complete flag 4d from signal relay processing unit 4 within the predefined time after changing the preparation request flag from disabled to enabled, preparation request flag 3c is automatically changed from enabled to disabled at time T3. Since this change of state is transmitted to the respective power supply processing units 2A to 2D in a parallel fashion via preparation request flag 4c in signal relay processing unit 4, the preparation complete flags in the respective power supply processing units 2A to 2D are forcefully disabled at time T6. This information is transmitted to signal relay processing unit 4 at time T7, updating the contents of the preparation complete flag register to "0000". When preparation request flag 3c in control processing unit 3 is changed from disabled to enabled, preparation complete flag register 4f in signal relay processing unit 4 may be reset as shown at time T8.

As described above, in the apparatus shown in FIG. 6, when control processing unit 3 does not receive the enabled state of preparation complete flag 4d from signal relay processing unit 4 within the predefined time after enabling preparation request flag 3c, preparation request flag 3c is automatically changed from enabled to disabled, and the preparation complete flags in the respective power supply processing units 2A to 2D are forcefully disabled, as a result of which the contents of preparation complete flag register 4f in signal relay processing unit 4 are updated to "0000". In this case, control processing unit 3 cannot identify the failed power supply processing unit from the value of preparation complete flag register 4f.

FIG. 8 is a time chart showing the flag states in the respective processing units when the states of preparation complete flags 2c (2A to 2D) in the respective power supply processing units connected to the signal relay processing unit 4 are all enabled but a certain power supply processing unit, for example, power supply processing unit 2D, fails when power is being normally supplied to the motor. In the case where control processing unit 3 has transmitted the enabled state of preparation request flag 3c, and in response, power supply processing units 2A to 2D have started operating normally and preparation complete flags 2c (2A) to 2c (2D) are transmitting enabled states. In this case, if power supply processing unit 2D fails at time T10, causing its preparation complete flag 2c (2D) to change from enabled to disabled, information notifying this change of state is received by signal relay processing unit 4 which, at time T11, updates the contents of the preparation complete flag register from "1111" to "0111" and changes the preparation complete flag 4d from enabled to disabled.

This enabled to disabled state change of preparation complete flag 4d is transmitted to control processing unit 3, whereupon the preparation request flag 3c in control processing unit 3 changes from enabled to disabled. Then, at time T12, preparation request flag 4c in signal relay processing unit 4 is caused to change from enabled to disabled. This change of state is transmitted to power supply processing units 2A to 2D in a parallel fashion (time T13), and as a result, all of preparation complete flags 2c (2A) to 2c (2D) are disabled, in response to which preparation complete flag register 4f in signal relay processing unit 4 is cleared to "0000" at time T14. As a result, as in the case of FIG. 7, control processing unit 3 cannot identify the failed power supply processing unit from the value of preparation complete flag register 4f.

SUMMARY OF THE INVENTION

The present invention has been devised in order to solve the above problem associated with the motor control apparatus in which the signal relay processing unit is provided between the control processing unit and the plurality of power supply processing units, and an object of the invention is to provide a motor control apparatus that can identify any power supply processing unit that has caused a failure from among the plurality of power supply processing units.

To achieve the above object, according to a first invention, there is provided a motor control apparatus comprising a control processing unit for creating a motor drive command based on an input signal, a plurality of power supply processing units for supplying a driving voltage to a motor based on the motor drive command, and a signal relay processing unit for supplying the motor drive command received from the control processing unit to the plurality of power supply processing units in a parallel fashion, wherein the control processing unit transmits a preparation request flag enabled state to the plurality of power supply processing units via the signal relay processing unit in order to instruct the plurality of power supply processing units to start preparation for driving the motor, the signal relay processing unit includes a preparation complete flag register for storing preparation complete flags each transmitted from each of the plurality of power supply processing units to indicate the completion of preparation for supplying power to the motor, and transmits a preparation complete flag enabled state to the control processing unit if it can be determined from the contents of the preparation complete flag register that the preparation is completed in all of the plurality of power supply processing units, and the control processing unit transmits a preparation request flag disabled state if the control processing unit does not receive the preparation complete flag enabled state from the signal relay processing unit within a predefined time after transmitting the preparation request flag enabled state, and wherein upon receiving the preparation request flag disabled state from the control processing unit, the signal relay processing unit stops updating the contents of the preparation complete flag register.

In the first invention, the signal relay processing unit may be configured to stop updating the contents of the preparation complete flag register until the signal relay processing unit receives a next preparation request flag enabled state from the control processing unit.

Further, the contents of the preparation complete flag register the updating of which has been stopped may be reset upon the signal relay processing unit receiving a next preparation request flag from the control processing unit.

To achieve the above object, according to a second invention, there is provided a motor control apparatus comprising a control processing unit for creating a motor drive command based on an input signal, a plurality of power supply processing units for supplying a driving voltage to a motor based on the motor drive command, and a signal relay processing unit for supplying the motor drive command received from the control processing unit to the plurality of power supply processing units in a parallel fashion, wherein the control processing unit transmits a preparation request flag enabled state to the plurality of power supply processing units via the signal relay processing unit in order to instruct the plurality of power supply processing units to start preparation for driving the motor, the signal relay processing unit includes a preparation complete flag register for storing preparation complete flags each transmitted from each of the plurality of power supply processing units to indicate the completion of preparation for supplying power to the motor, and transmits a preparation complete flag enabled state to the control processing unit if it can be determined from the contents of the preparation complete flag register that the preparation is completed in all of the plurality of power supply processing units, and the control processing unit transmits a preparation request flag disabled state if the control processing unit does not receive the preparation complete flag enabled state from the signal relay processing unit within a predefined time after transmitting the preparation request flag enabled state, and wherein upon receiving the preparation request flag disabled state from the control processing unit, the signal relay processing unit stops transmission of the preparation request flag disabled state to the plurality of power supply processing units, and thereby holds the contents of the preparation complete flag register in a state that existed just before the reception of the preparation request flag disabled state.

In the second invention, the contents of the preparation complete flag register may be held in that state until the signal relay processing unit receives a next preparation request flag enabled state from the control processing unit. Further, the contents of the preparation complete flag register held in that state may be reset upon the signal relay processing unit receiving a next preparation request flag from the control processing unit.

Further, in the first and second inventions, the contents of the preparation complete flag register the updating of which has been stopped may be transmitted from the signal relay processing unit to the control processing unit, thereby enabling the control processing unit to identify any power supply processing unit that failed to complete the preparation for supplying power to the motor. In this case, upon identifying any power supply processing unit that failed to complete the preparation for supplying power to the motor, the control processing unit may transmit an alarm along with information of the identification to outside of the apparatus.

In the first invention, after the control processing unit has transmitted the preparation request flag enabled state, if any power supply processing unit fails to operate normally due to some kind of trouble or fault, the signal relay processing unit stops updating the contents of the preparation complete flag register upon detecting the enabled to disabled state change of the preparation request flag. Therefore, the control processing unit can identify the failed power supply processing unit from the contents of the preparation complete flag register the updating of which has been stopped.

In the second invention, after the control processing unit has transmitted the preparation request flag enabled state, if any power supply processing unit fails to operate normally due to some kind of trouble or fault, the signal relay processing unit may detect the enabled to disabled state change of the preparation request flag but does not transmit this change of state to the power supply processing units. As a result, since each power supply processing unit holds its preparation complete flag in the state effected at the time of the occurrence of the fault, the contents of the preparation complete flag register are also held accordingly. Therefore, the control processing unit can identify the failed power supply processing unit by checking the contents of the preparation complete flag register.

BRIEF DESCRIPTION OF THE DRAWINGS

FIG. 12B is a diagram showing the second half of the flow chart illustrating the procedure for carrying out the operation shown in FIGS. 10 and 11.

FIG. 13 is still another time chart for explaining the operation of the motor control apparatus according to the first embodiment of the present invention.

FIG. 16B is a diagram showing the second half of the flow chart illustrating the procedure for carrying out the operation shown in FIG. 15.

FIG. 17 is another time chart explaining the operation of the motor control apparatus according to the second embodiment of the present invention.

FIG. 18 is a flow chart illustrating the procedure for carrying out the operation shown in FIG. 17.

DETAILED DESCRIPTION

Figure 1:
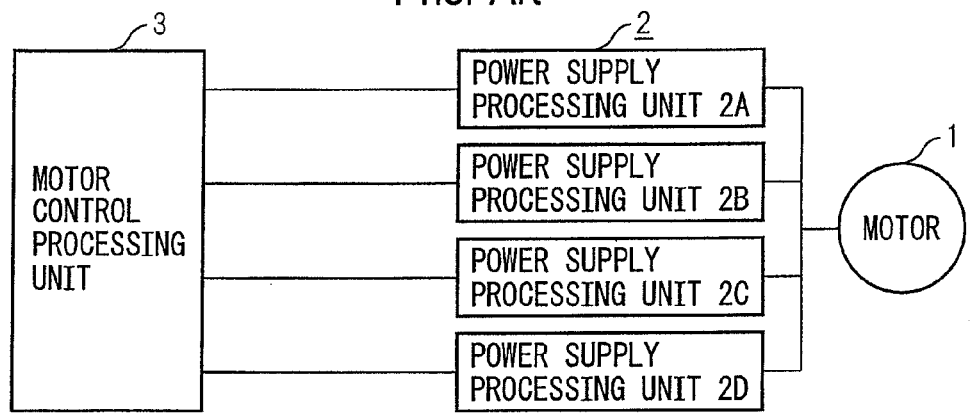
FIG. 1 is a diagram showing the configuration of a prior art motor control apparatus.
Figure 2:
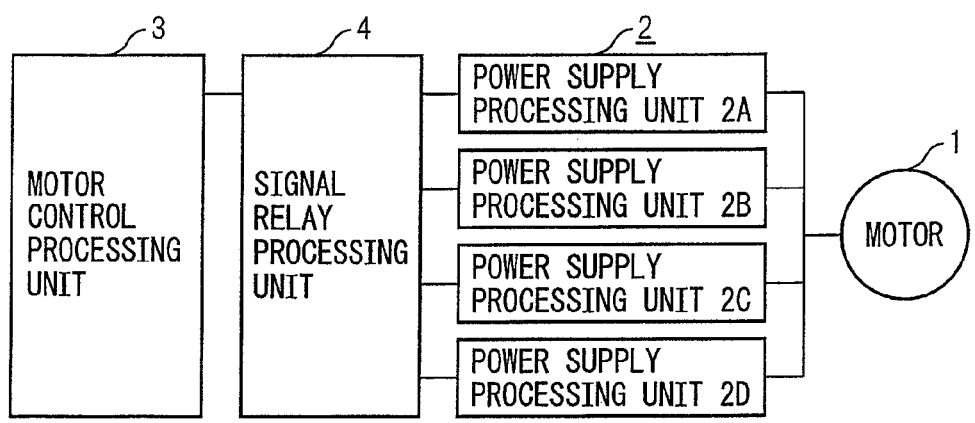
FIG. 2 is a diagram showing the configuration of a motor control apparatus constructed by improving the apparatus of FIG. 1.

The embodiments of the present invention will be described with reference to the drawings. In the drawings given hereinafter, the same reference numerals as those in FIGS. 1 to 8 designate the same or similar component elements, and the description of such elements will not be repeated herein.

Figure 3:
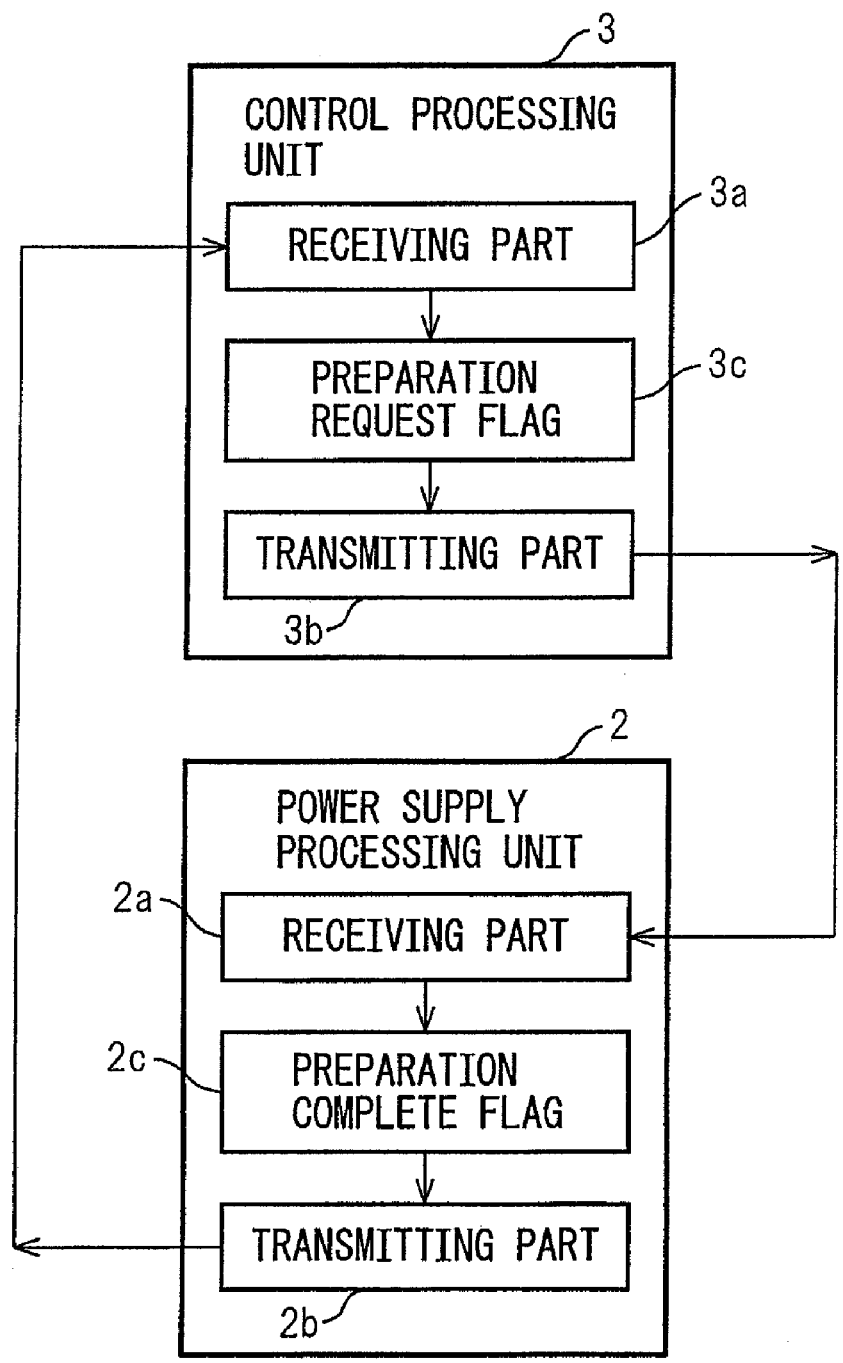
FIG. 3 is a diagram showing a flag control mechanism for the apparatus shown in FIG. 1.
Figure 4:
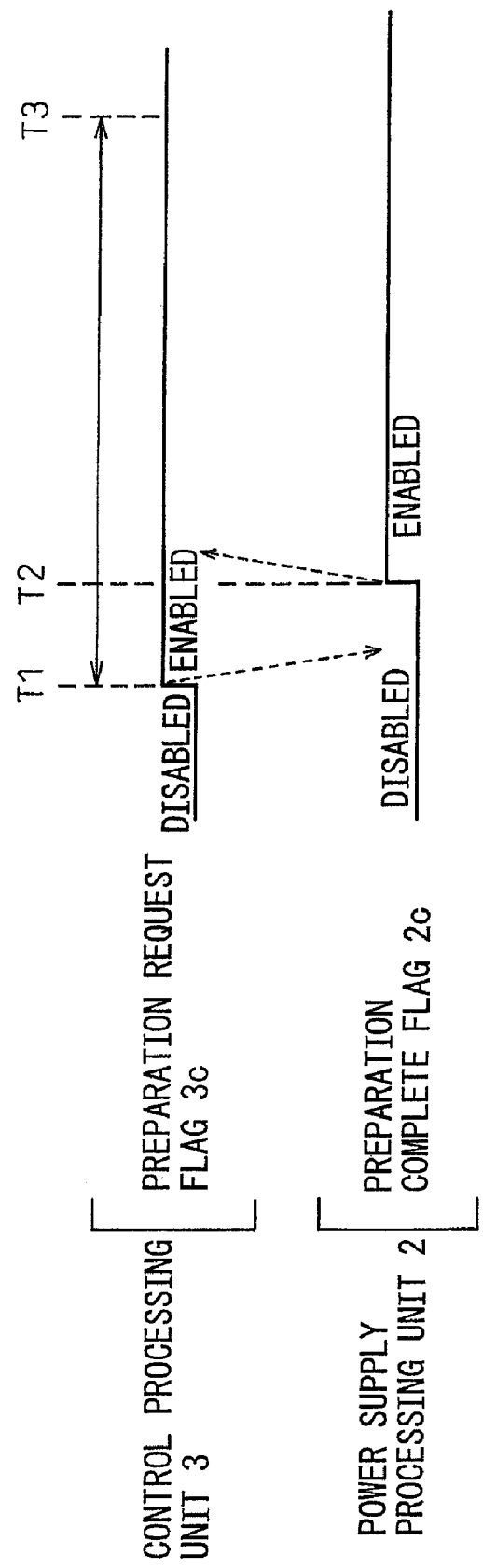
FIG. 4 is a time chart explaining the operation of the apparatus shown in FIG. 1.
Figure 5:
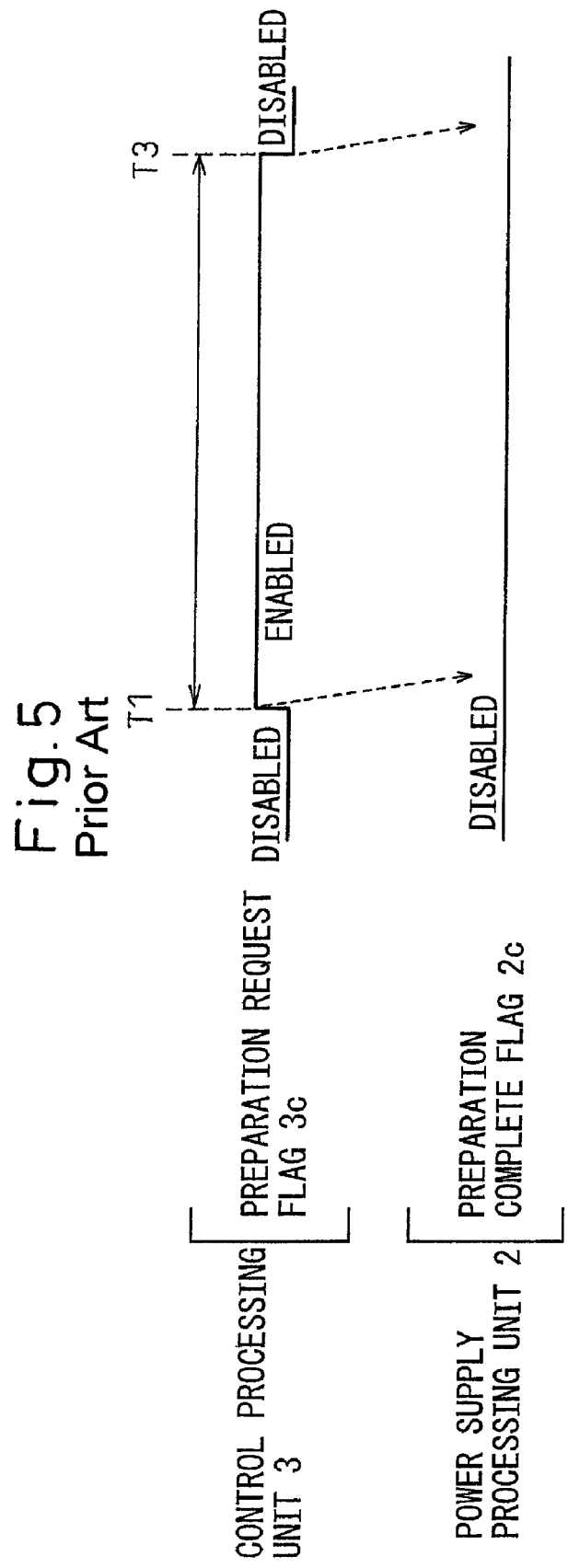
FIG. 5 is another time chart for explaining the operation of the apparatus shown in FIG. 1.
Figure 6:
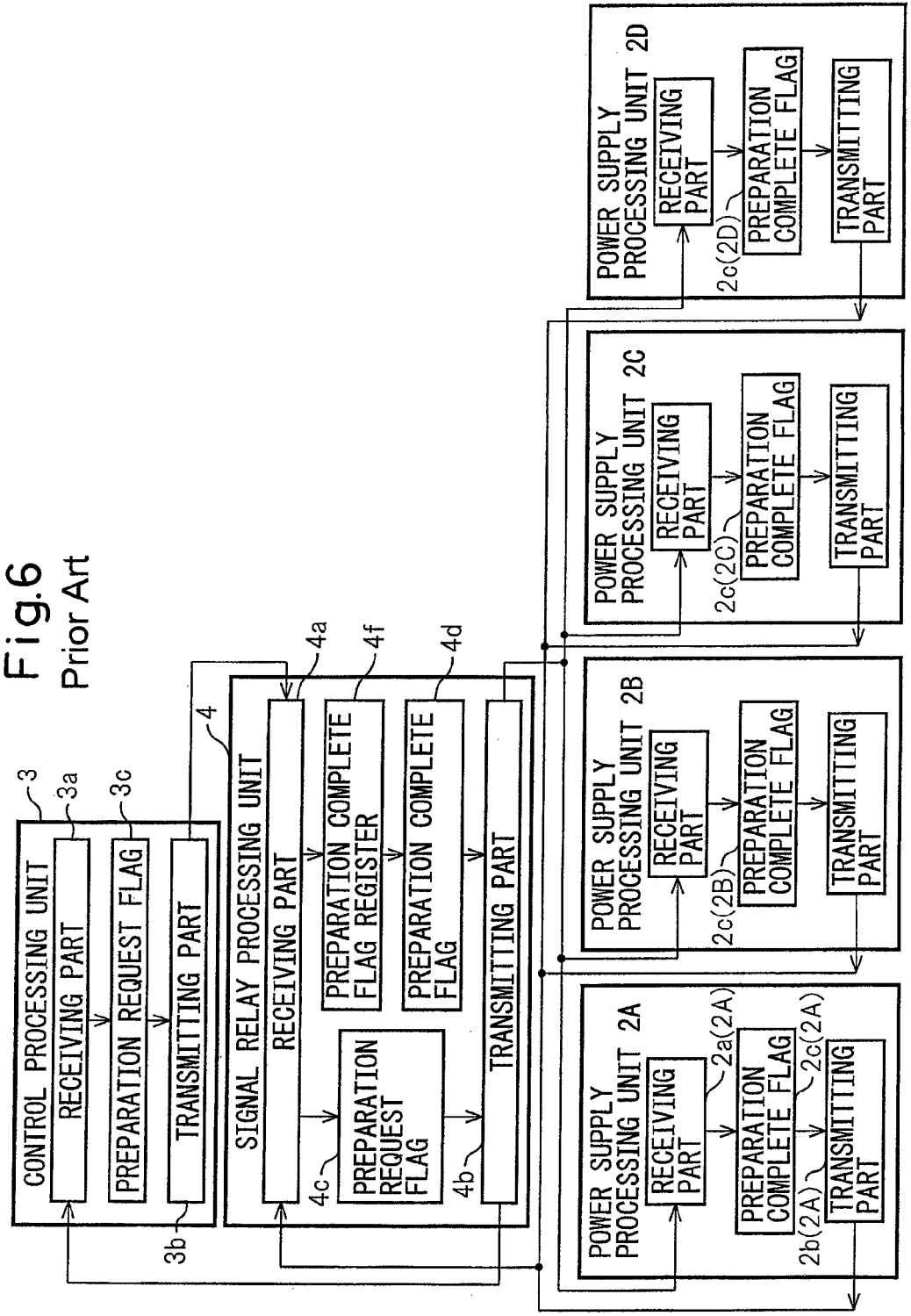
FIG. 6 is a diagram showing a flag control mechanism for the apparatus shown in FIG. 2.
Figure 7:
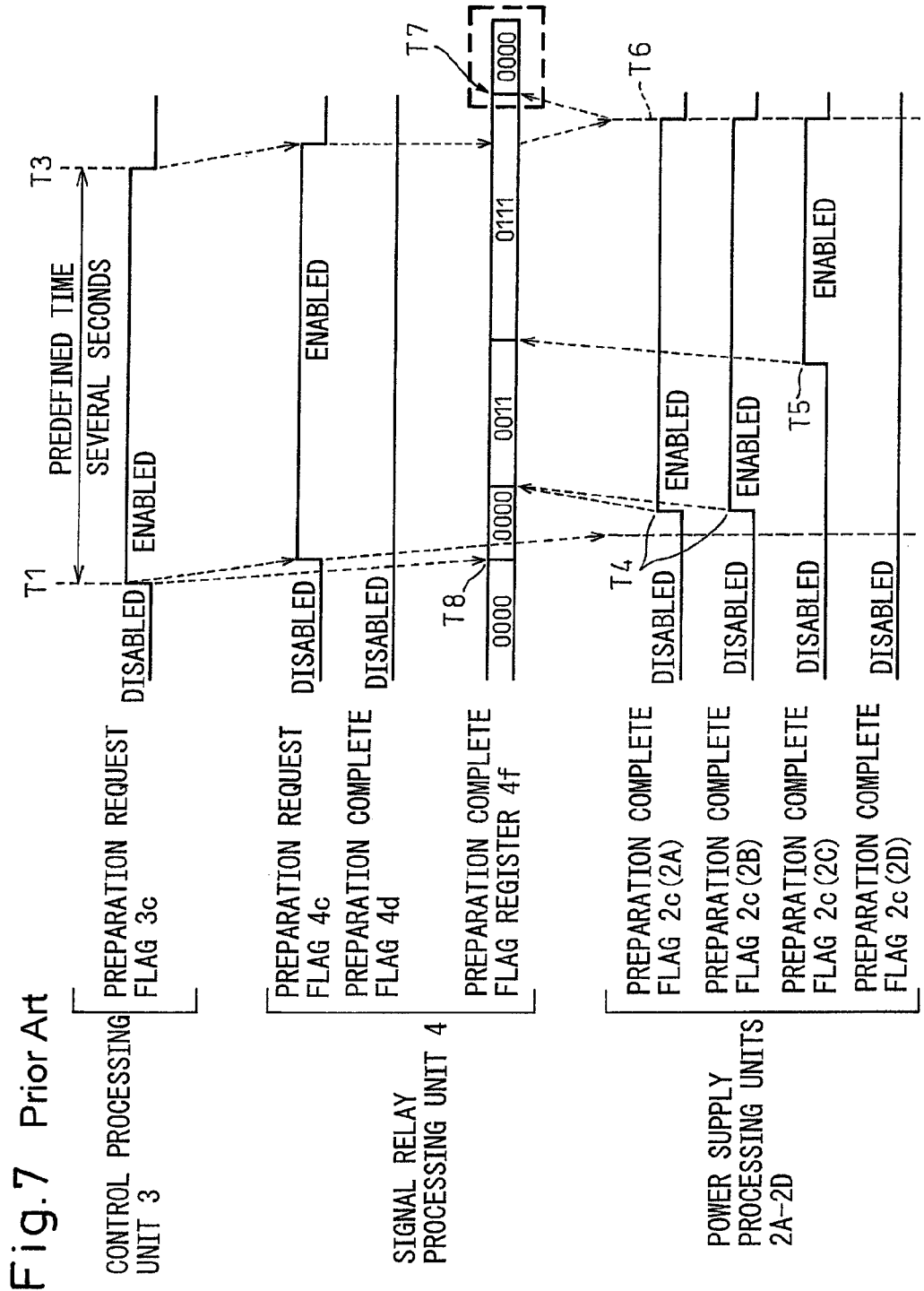
FIG. 7 is a time chart explaining the operation of the apparatus shown in FIG. 2.
Figure 8:
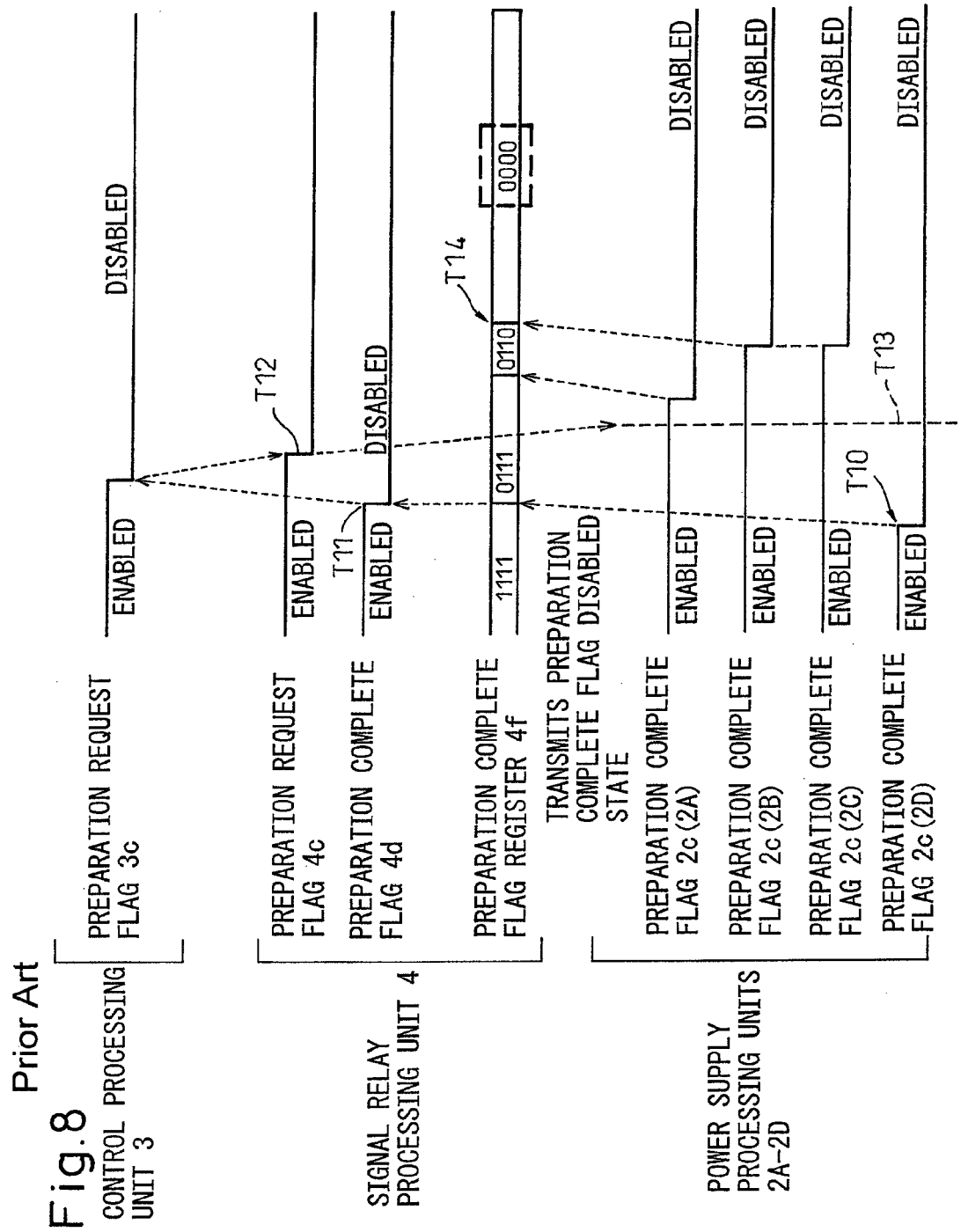
FIG. 8 is another time chart for explaining the operation of the apparatus shown in FIG. 2.
Figure 9:
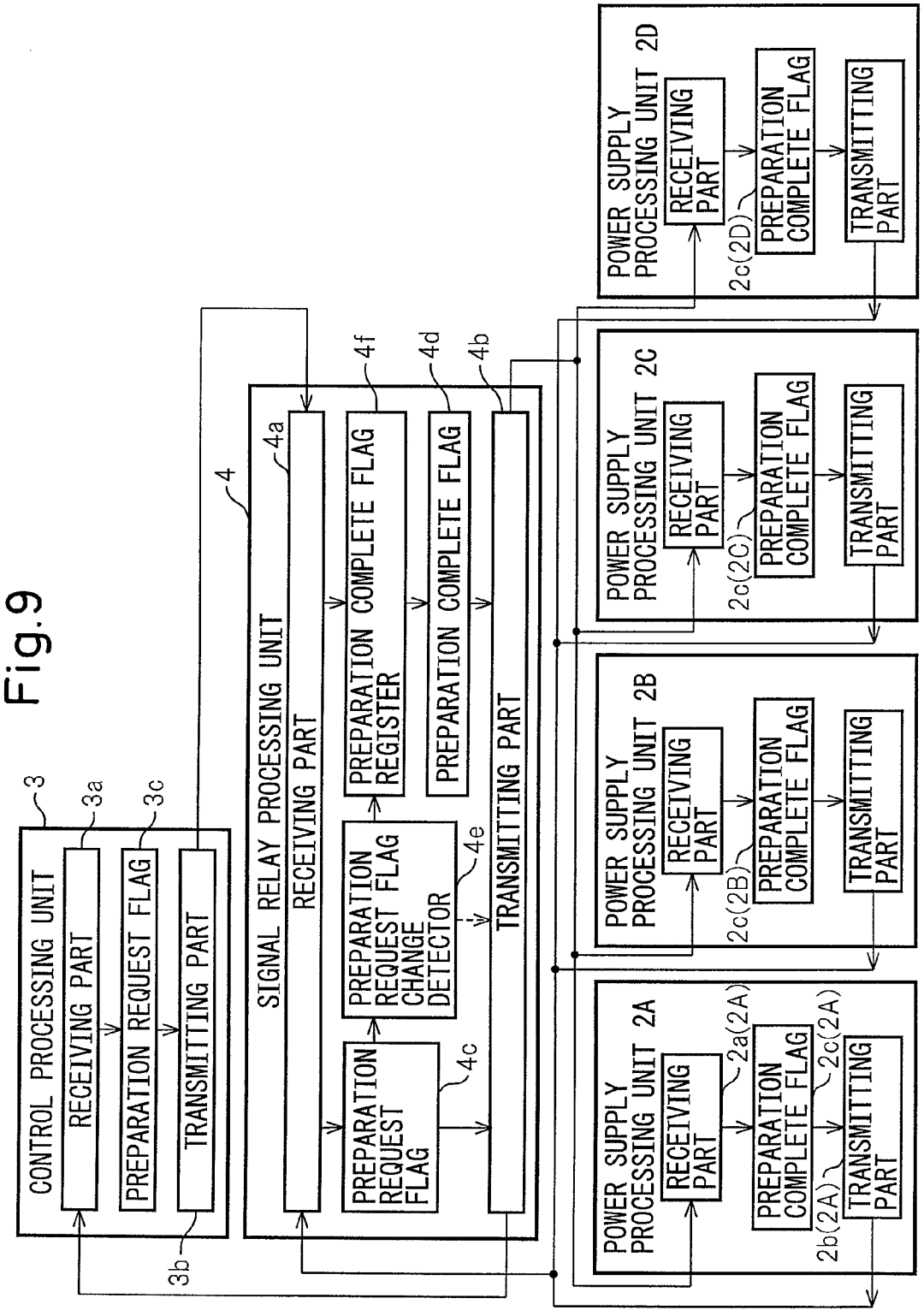
FIG. 9 is a diagram showing, among others, a flag control mechanism for a motor control apparatus according to first and second embodiments of the present invention.

FIG. 9 is a block diagram showing the configuration of a motor control apparatus according to first and second embodiments of the present invention; as in FIGS. 3 and 6, the configuration of the major portion for implementing the transmission and reception of the preparation request and preparation complete flags is shown here. In the motor control apparatus according to the first embodiment, the signal relay processing unit (PDM) 4 includes a preparation request flag change detector 4e in order to identify a power supply processing unit (for example, an inverter unit) that has caused a failure, and provisions are made to stop updating the contents of preparation complete flag register 4f, i.e., the values of preparation complete flags 2c (2A) to 2c (2D) in the respective power supply processing units 2A to 2D connected to signal relay processing unit 4, when the value of preparation request flag 4c has changed from enabled to disabled.

On the other hand, in the motor control apparatus according to the second embodiment, in order to identify a power supply processing unit that has caused a failure, provisions are made not to transmit the disable signal of the preparation request flag to power supply processing units 2A to 2D by controlling transmitting part 4b when preparation request flag change detector 4e provided in signal relay processing unit 4 has detected that the value of preparation request flag 4c has changed from enabled to disabled. With this arrangement, since the disabled state of the preparation request flag is not transmitted to power supply processing units 2A to 2D, preparation complete flags 2c (2A) to 2c (2D) are not forcefully disabled, and therefore, preparation complete flag register 4f can hold the contents at the time of the occurrence of the failure. In the above first and second embodiments, the contents of preparation complete flag register 4f the updating of which has been stopped are transmitted to control processing unit 3 which can thus identify the failed power supply processing unit.

The operation of the apparatus according to the first embodiment will be described below with reference to the time charts and flow charts shown in FIGS. 10 to 14.

Figure 10:
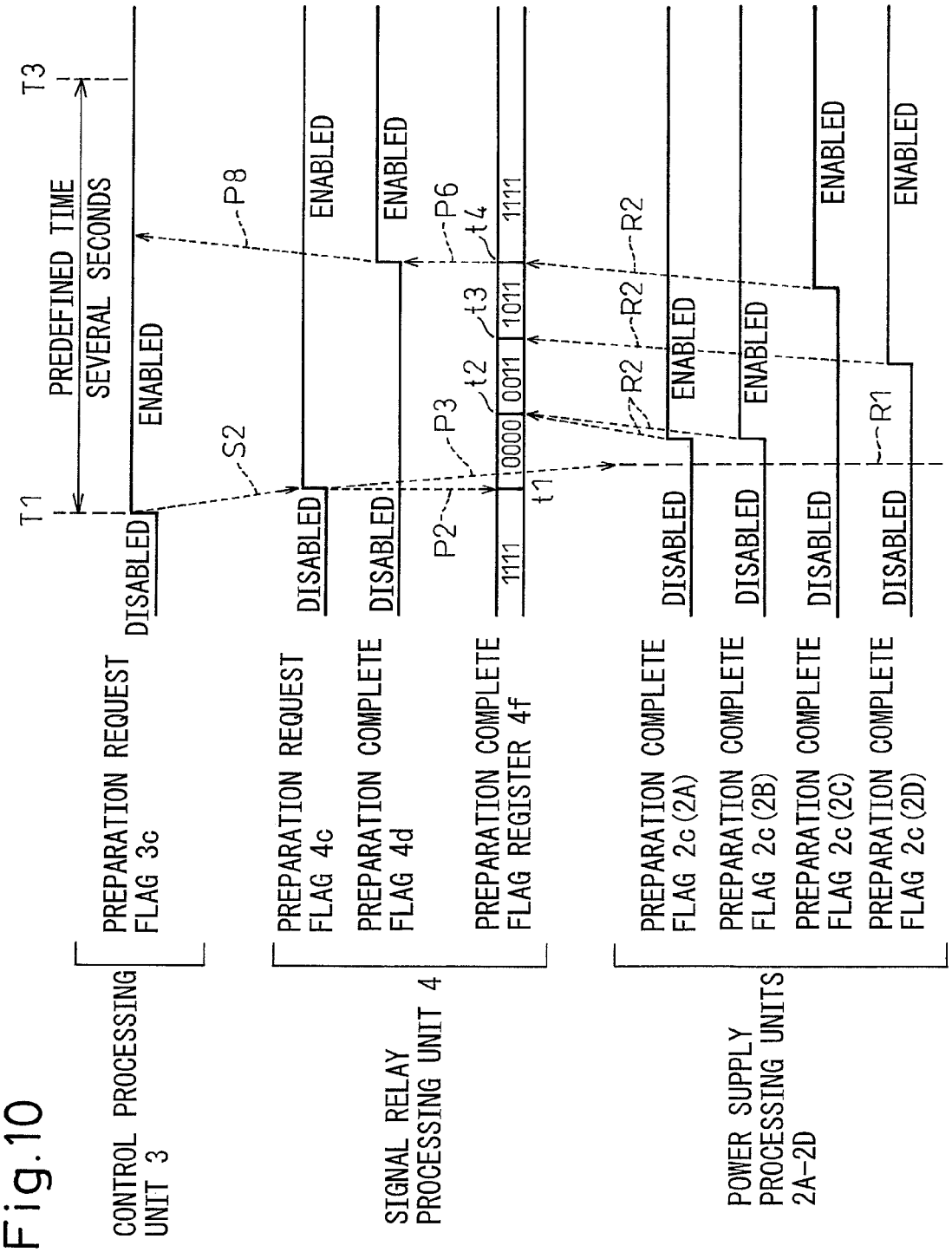
FIG. 10 is a time chart explaining the operation of the motor control apparatus according to the first embodiment of the present invention.

FIG. 10 is a time chart illustrating the operation for the case where, in the apparatus shown in FIG. 9, control processing unit (CNC) 3 has been able to receive the enabled state of the preparation complete flag within the predefined time interval (T1 to T3) from signal relay processing unit 4 and, as a result, control processing unit 3 has been able to normally output the motor drive command to signal relay processing unit 4. On the other hand, FIG. 11 is a time chart illustrating the operation for the case where, despite the output of the preparation complete flag enabled state from control processing unit 3, power supply processing unit 2D has been unable to change preparation complete flag 2c (2D) from disabled to enabled due to some kind of trouble, and as a result, control processing unit 3 has failed to receive the enabled state of the preparation complete flag from signal relay processing unit 4 within the predefined time interval (T1 to T3).

Figure 11:
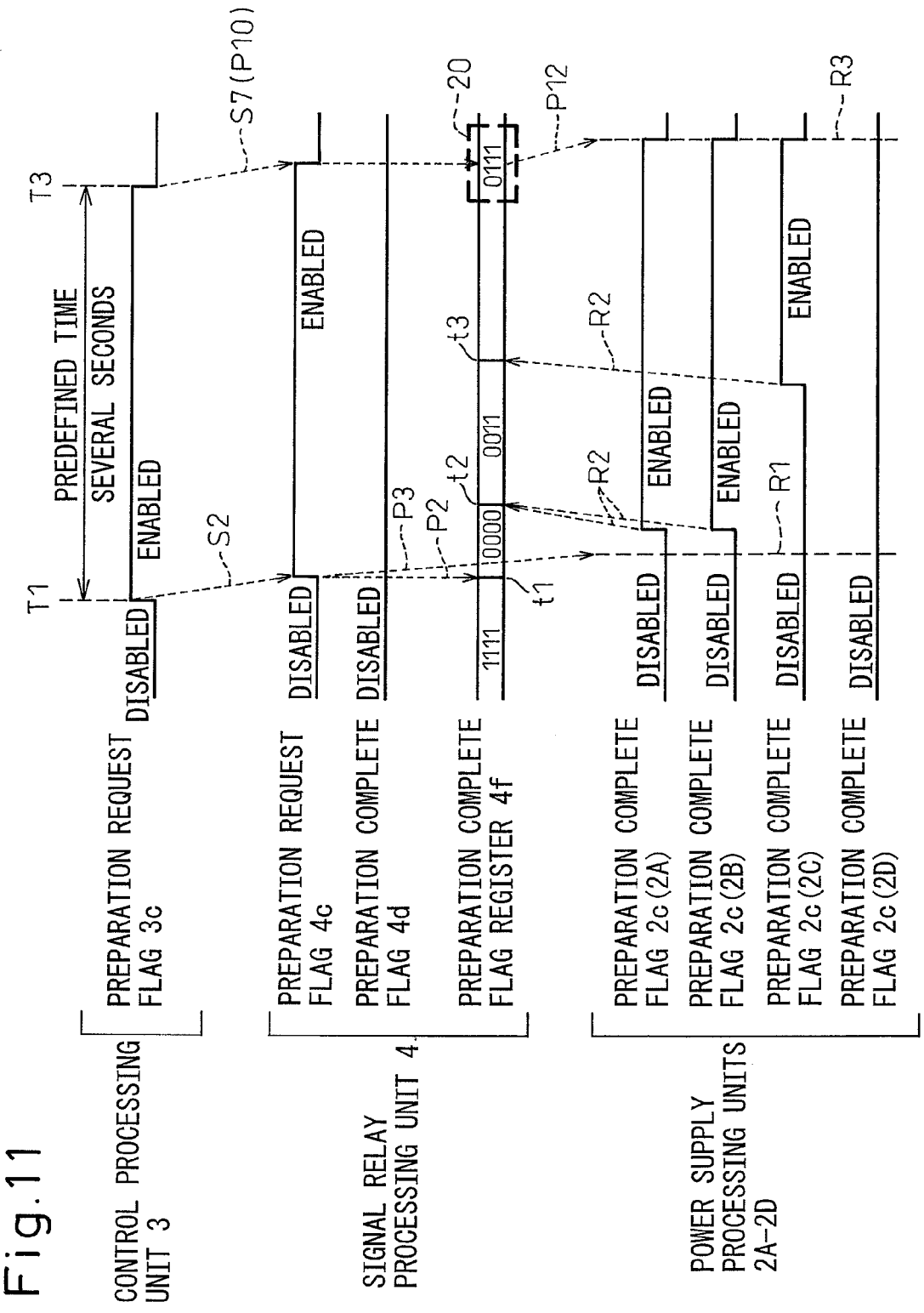
FIG. 11 is another time chart explaining the operation of the motor control apparatus according to the first embodiment of the present invention.
Figure 12A:
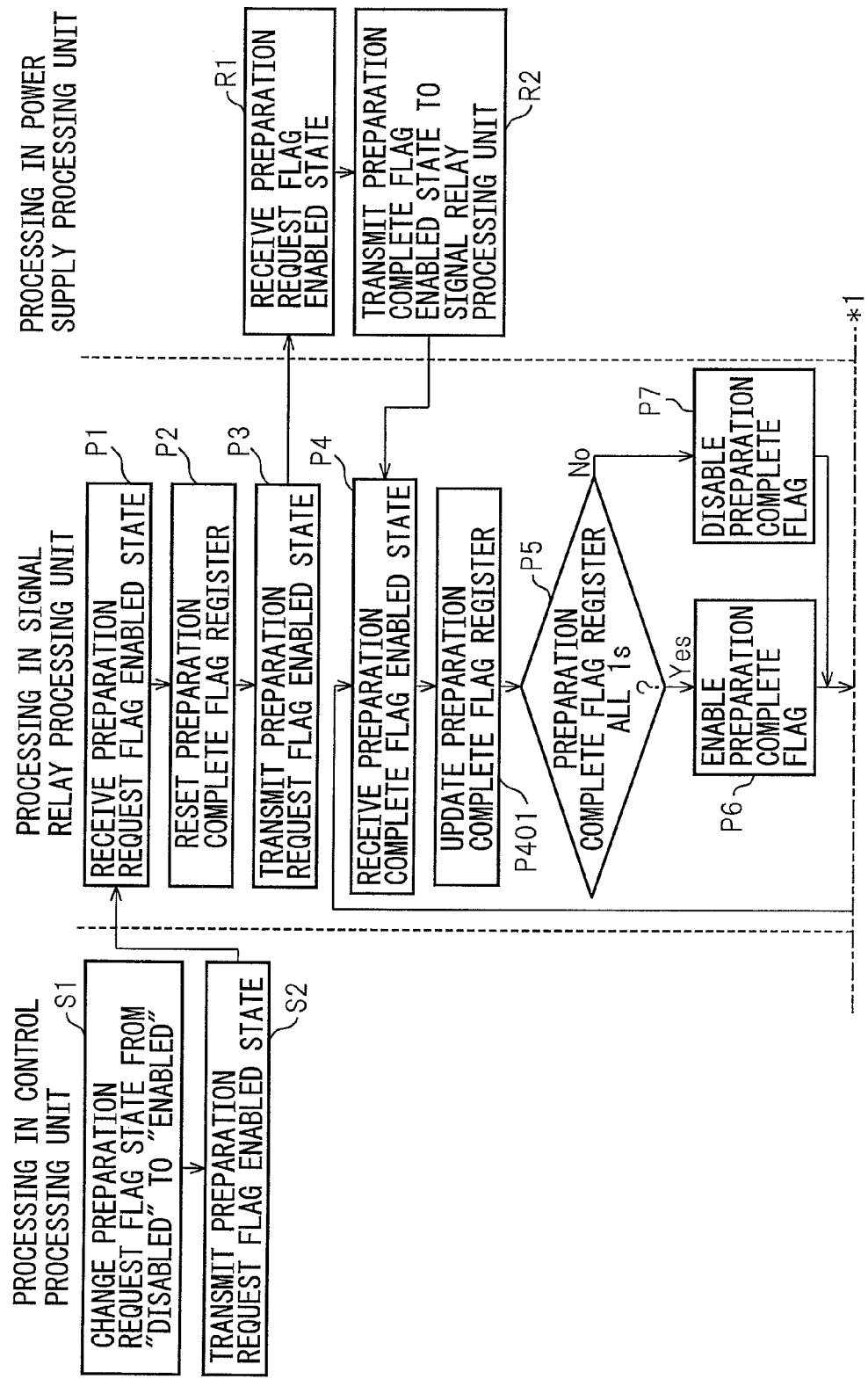
FIG. 12A is a diagram showing the first half of a flow chart illustrating the procedure for carrying out the operation shown in FIGS. 10 and 11.

FIGS. 12A and 12B are flowcharts illustrating the flow of the operation shown in FIGS. 10 and 11. The operation of the motor control apparatus shown in FIGS. 10 and 11 will be described below with reference to the flowchart of FIGS. 12A and 12B. As shown in FIGS. 12A and 12B, when control processing unit 3 changes the state of preparation request flag 3c from disabled to enabled (step S1), the signal indicating the change of state is transmitted via its transmitting part 3b to receiving part 4a of signal relay processing unit 4 (step S2). When the preparation request flag enabled state is received (step P1), the signal relay processing unit 4 resets preparation complete flag register 4f (step P2) and transmits the preparation request flag enabled state to the respective power supply processing units 2A to 2D in a parallel fashion (step P3). In FIGS. 10 and 11, until time t1, preparation complete flag register 4f retains the contents updated when preparation complete flag 4c was last changed from enabled to disabled, as will be described later, but when preparation complete flag 4c changes from disabled to enabled at time t1, the contents are reset (to "0000") and the updating is resumed.

When power supply processing units 2A to 2D receive the preparation request flag enabled state (step R1), each power supply processing unit changes its preparation complete flag state from disabled to enabled as it completes preparation for supplying power to the motor, and transmits information indicating the change of state to signal relay processing unit 4 (step R2). As a result, as shown in FIGS. 10 and 11, the contents of preparation complete flag register 4f in signal relay processing unit 4 are updated to "0011" at time t2, then to "1011" at time t3. Here, the value "1011", for example, means that preparation complete flags 2c (2A), 2c (2B), and 2c (2D) in power supply processing units 2A, 2B, and 2D are enabled but preparation complete flag 2c (2C) in power supply processing unit 2C remains disabled.

As signal relay processing unit 4 receives the preparation complete flag from each power supply processing unit 2, signal relay processing unit 4 updates preparation complete flag register 4f (step P401) and checks preparation complete flag register 4f to see if all the preparation complete flags have been enabled or not (step P5). If the answer is YES, preparation complete flag 4d in signal relay processing unit 4 is enabled. In the example shown in FIG. 10, since all the preparation complete flags from power supply processing unit 2 have been enabled by time t4, preparation complete flag 4d in signal relay processing unit 4 is enabled at time t4. If the answer is NO in step P5, preparation complete flag 4d is disabled (step P7).

Signal relay processing unit 4 transmits preparation complete flag 4d to control processing unit 3 (step P8) by repeating the process from step P4 onward until the predefined time (T1 to T3) elapses (YES in step P9). Control processing unit 3 continues to receive preparation complete flag 4d from signal relay processing unit 4 over the predefined time interval (T1 to T3) (the period during which the answer in step S4 is NO) and, after the predefined time has elapsed (YES in step S4), the control processing unit 3 checks to see whether received preparation complete flag 4d is enabled or not (step S5). If YES in step S5, that is, if received preparation complete flag 4d is enabled, control processing unit 3 outputs the motor drive command by determining that power supply processing units 2A to 2D have started operating normally (step S6).

In the example of FIG. 10, since preparation complete flag 4d is enabled at time t4, and information indicating the enabled state is transmitted to control processing unit 3, control processing unit 3 carries out step S6 at time T3 and outputs the motor drive command. On the other hand, as in the example of FIG. 11, if all the preparation complete flags from power supply processing unit 2 are not enabled even after the predefined time has elapsed (NO in step S5), control processing unit 3 transmits the disabled state of preparation request flag 3c to signal relay processing unit 4 (step S7). When signal relay processing unit 4 receives the disabled state of preparation request flag 3c from control processing unit 3 (step P10), signal relay processing unit 4 stops updating value 20 of preparation complete flag register 4f and transmits the last updated value to control processing unit 3 (step P11). Control processing unit 3 checks the thus received value of the preparation complete flag register to identify the power supply processing unit whose preparation complete flag did not change to the enabled state because of the occurrence of failure (step S8), and carries out fault processing such as an alarm indication (step S9).

Signal relay processing unit 4 transmits the disabled state of preparation request flag 4c to all the power supply processing units (step P12) after completing step P11 or at the same time that step P11 is carried out, and when the power supply processing units receive the disabled state of preparation request flag 4c (step R3), the power supply processing units disable their preparation complete flags 2c (2A) to 2c (2D) (step R4).

Figure 14:
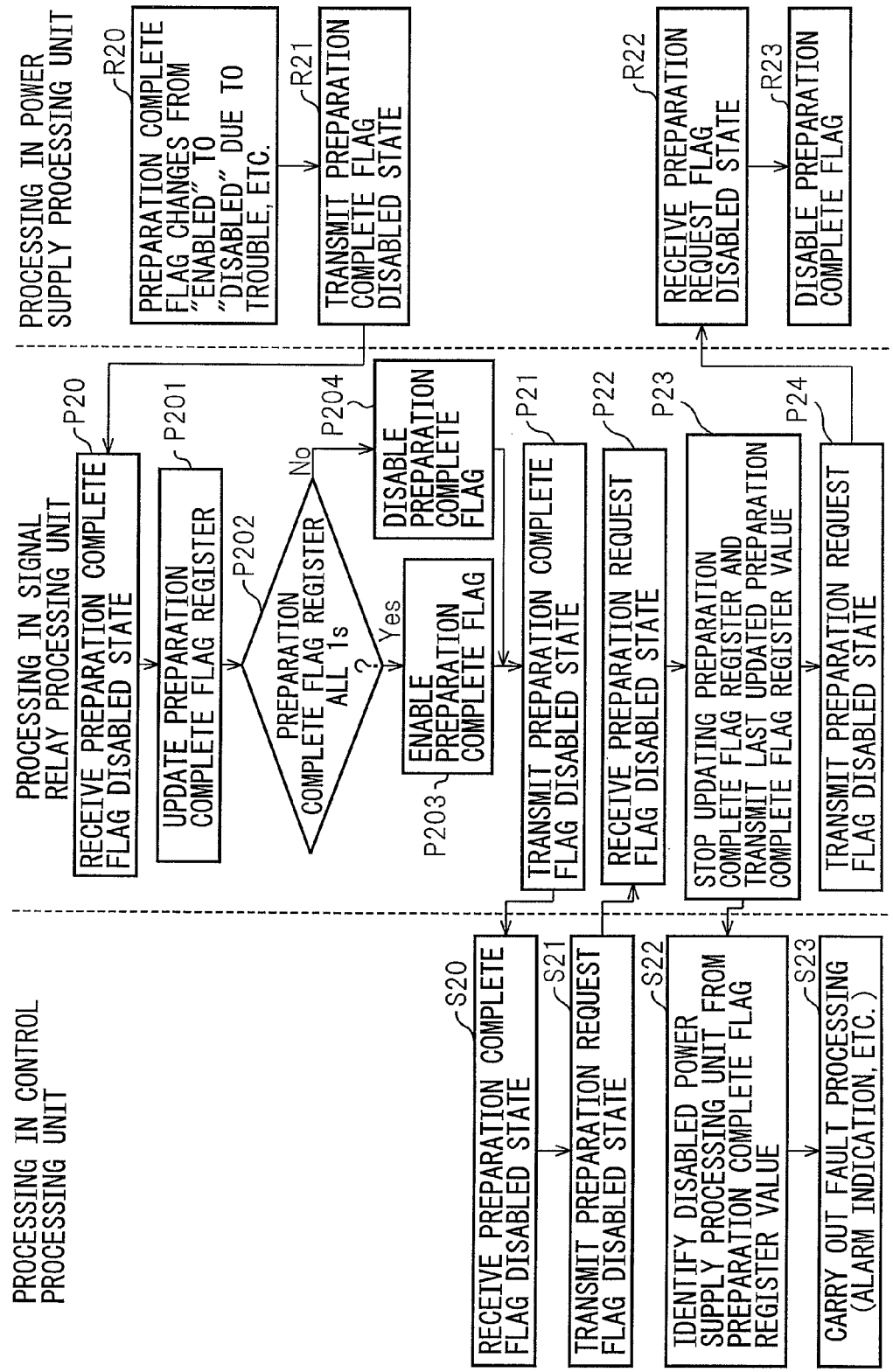
FIG. 14 is a flow chart illustrating the procedure for carrying out the operation shown in FIG. 13.

FIG. 13 is a time chart showing the operation of the motor control apparatus for the case where the preparation complete flag in the power supply processing unit 2D changes from enabled to disabled during the operation, and FIG. 14 is a flowchart showing the flow of processing performed between the respective processing units. As shown in FIG. 13, when the motor is operating normally with all the preparation complete flags 2c (2A) to 2c (2D) enabled in power supply processing units 2A to 2D, if preparation complete flag 2c (2D) in power supply processing unit 2D changes from enabled to disabled, for example, at time t10 due to some kind of trouble (step R20 in FIG. 14), information indicating this change of state is transmitted to signal relay processing unit 4 (step R21). When this information is received (step P20), signal relay processing unit 4 updates preparation complete flag register 4f (step P201) and checks the contents of the preparation complete flag register to see whether all the preparation complete flags are enabled or not (step P202). If YES, preparation complete flag 4d in signal relay processing unit 4 is enabled (step P203). If NO in step P202, preparation complete flag 4d is disabled (step P204).

In the example shown in FIG. 13, since the value of preparation complete flag register 4f changes from "1111" to "0111", the state of preparation complete flag 4d in signal relay processing unit 4 changes from enabled to disabled, and information indicating this change of state is transmitted to control processing unit 3 (step P21). When the disabled state of preparation complete flag 4d is received (step S20), control processing unit 3 changes preparation request flag 3c from enabled to disabled, and transmits the disabled state of preparation request flag 3c to signal relay processing unit 4 (step S21). When the disabled state of preparation request flag 3c is received (step P22), signal relay processing unit 4 stops updating preparation complete flag register 4f, and transmits the last updated value to control processing unit 3 (step P23). Then, control processing unit 3 identifies the disabled power supply processing unit from the value of preparation complete flag register 4f thus received (step S22), and carries out fault processing such as an alarm indication (step S24).

After stopping the updating of preparation complete flag register 4f and transmitting the last updated value to control processing unit 3 (step P23), signal relay processing unit 4 transmits the disabled state of preparation request flag 3c to power supply processing units 2A to 2D (step P24), upon receiving the disabled state (step R22), power supply processing units 2A to 2D change their preparation complete flags 2c (2A) to 2c (2D) from enabled to disabled (step R23) and make preparation to stop the motor.

FIGS. 15 to 18 are time charts and flow charts illustrating the operation of the motor control apparatus according to the second embodiment of the present invention. As shown in FIG. 9, in the motor control apparatus according to the second embodiment of the present invention, signal relay processing unit 4 includes preparation request flag change detector 4e, and when detector 4e detects that preparation request flag 4c has changed from enabled to disabled, transmitting part 4b is controlled so as not to transmit the disabled state of preparation request flag 4c to power supply processing units 2A to 2D. With this arrangement, power supply processing units 2A to 2D continue to hold the enabled or disabled states effected before preparation request flag 4c was changed from enabled to disabled and, as a result, the contents of preparation complete flag register 4f in signal relay processing unit 4 remain unchanged. Since this information is transmitted to control processing unit 3, control processing unit 3 can identify the failed power supply processing unit.

Figure 15:
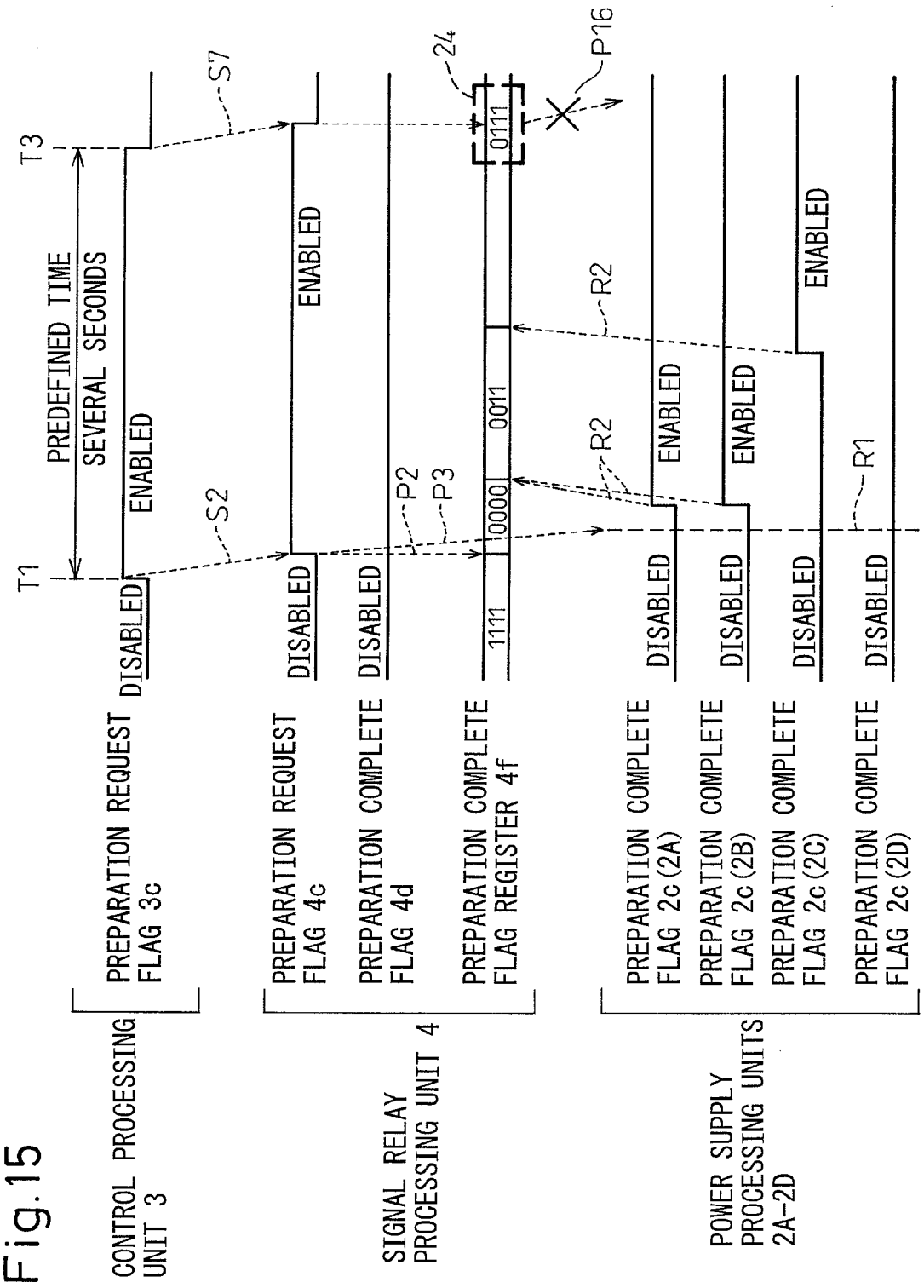
FIG. 15 is a time chart explaining the operation of the motor control apparatus according to the second embodiment of the present invention.
Figure 16A:
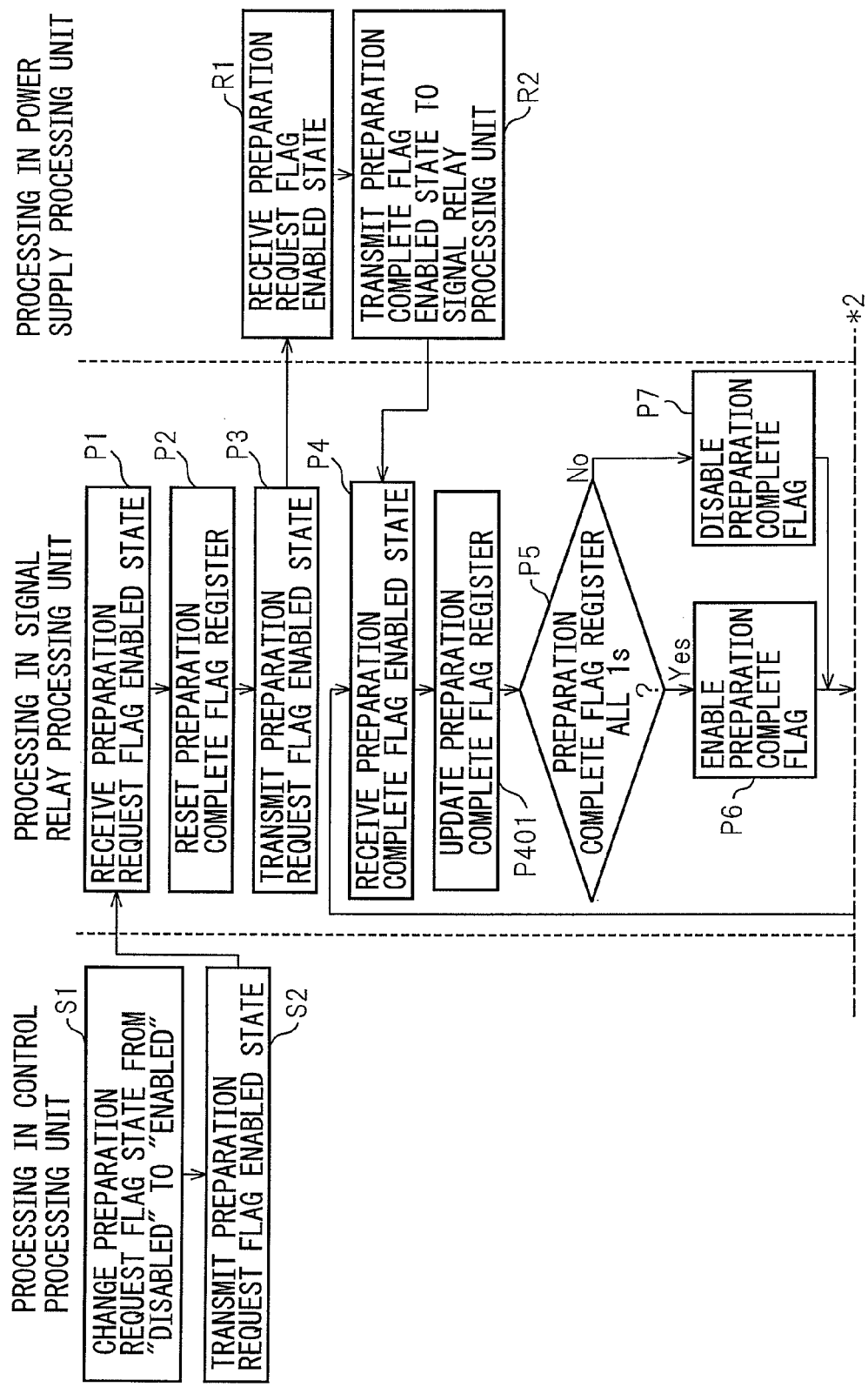
FIG. 16A is a diagram showing the first half of a flow chart illustrating the procedure for carrying out the operation shown in FIG. 15.

FIG. 15 is a time chart illustrating the operation for the case where, in the motor control apparatus according to the second embodiment of the present invention, control processing unit 3 does not receive the preparation complete flag enabled state within the predefined time after transmitting the preparation request flag enabled state. The time chart of FIG. 15 and the flow chart of FIGS. 16A and 16B are substantially the same as the time chart of FIG. 11 and the flow chart of FIG. 12, respectively, but the difference is that even when control processing unit 3 transmits the disabled state of preparation request flag 3c to signal relay processing unit 4 (step S7 in FIG. 16B) after failing to receive the enabled state of preparation complete flag 4d from signal relay processing unit 4 by time T3 shown in FIG. 15, signal relay processing unit 4 that received the disabled state (step P10 in FIG. 16B) does not transmit the disabled state of preparation request flag 4c to power supply processing units 2 (step P16). Since power supply processing units 2 cannot receive the disabled state of the preparation request flag (step R10), the power supply processing units continue to hold the preparation complete flag states effected before time T3 (step R11).

Accordingly, when control processing unit 3 changes the state of preparation request flag 3c from enabled to disabled, the contents of preparation complete flag register 4f before the change are retained (indicated at 24 in FIG. 15), and the thus retained value is transmitted to control processing unit 3 (step P15). In this way, control processing unit 3 can identify the failed power supply processing unit (step S8) and can carry out fault processing (step S9).

FIG. 17 shows the time chart for the case where, in the second embodiment, all the power supply processing units are enabled and power is supplied normally to the motor, and FIG. 18 is a flow chart illustrating the sequence of operations for that case. The time chart and the flow chart shown here are substantially the same as those of the first embodiment shown in FIGS. 13 and 14, but the difference from the first embodiment lies in the process to be performed after control processing unit 3 receives the disabled state of preparation complete flag 4*d* from signal relay processing unit 4 (step S20 in FIG. 18) and disables preparation request flag 3*c* and transmits this disabled state to signal relay processing unit 4 (step S21 in FIG. 18).

More specifically, when the disabled state of preparation request flag 3*c* is received (step P22), signal relay processing unit 4 disables its own preparation request flag 4*c*, but does not transmit this disabled state to power supply processing units 2A to 2D (step P31). Since power supply processing units 2A to 2D cannot receive the disabled state of the preparation request flag (step R30), preparation complete flags 2*c* (2A) to 2*c* (2D) in the respective power supply processing units retain the states effected before preparation request flags 3*c* and 4*c* were disabled (indicated at 26 in FIG. 17, step R31 in FIG. 18). The thus retained contents of preparation complete flag register 4*f* are transmitted to control processing unit 3 (step P30) which thus identifies the disabled power supply processing unit (step S22). After that, control processing unit 3 carries out fault processing in step S23, and outputs a motor drive stop command causing power supply processing units 2A to 2D to stop supplying power to the motor.

What is claimed is:

1. A motor control apparatus comprising a control processing unit for creating a motor drive command based on an input signal, a plurality of power supply processing units for supplying a driving voltage to a motor based on said motor drive command, and a signal relay processing unit for supplying said motor drive command received from said control processing unit to said plurality of power supply processing units in a parallel fashion, wherein said control processing unit transmits a preparation request flag enabled state to said plurality of power supply processing units via said signal relay processing unit in order to instruct said plurality of power supply processing units to start preparation for driving said motor, said signal relay processing unit includes a preparation complete flag register for storing preparation complete flags each transmitted from each of said plurality of power supply processing units to indicate the completion of preparation for supplying power to said motor, and transmits a preparation complete flag enabled state to said control processing unit if it can be determined from the contents of said preparation complete flag register that the preparation is completed in all of said plurality of power supply processing units, and said control processing unit transmits a preparation request flag disabled state if said control processing unit does not receive said preparation complete flag enabled state from said signal relay processing unit within a predefined time after transmitting said preparation request flag enabled state, and wherein
upon receiving said preparation request flag disabled state from said control processing unit, said signal relay processing unit stops updating the contents of said preparation complete flag register.

2. A motor control apparatus as claimed in claim 1, wherein said signal relay processing unit stops updating the contents of said preparation complete flag register until said signal relay processing unit receives a next preparation request flag enabled state from said control processing unit.

3. A motor control apparatus as claimed in claim 2, wherein the contents of said preparation complete flag register the updating of which has been stopped are reset upon said signal relay processing unit receiving a next preparation request flag from said control processing unit.

4. A motor control apparatus as claimed in claim 1, wherein the contents of said preparation complete flag register the updating of which has been stopped are reset upon said signal relay processing unit receiving a next preparation request flag from said control processing unit.

5. A motor control apparatus as claimed in claim 1, wherein the contents of said preparation complete flag register the updating of which has been stopped are transmitted from said signal relay processing unit to said control processing unit, thereby enabling said control processing unit to identify any power supply processing unit that failed to complete the preparation for supplying power to said motor.

6. A motor control apparatus as claimed in claim 5, wherein, upon identifying any power supply processing unit that failed to complete the preparation for supplying power to said motor, said control processing unit transmits an alarm along with information of said identification to outside of said apparatus.

7. A motor control apparatus comprising a control processing unit for creating a motor drive command based on an input signal, a plurality of power supply processing units for supplying a driving voltage to a motor based on said motor drive command, and a signal relay processing unit for supplying said motor drive command received from said control processing unit to said plurality of power supply processing units in a parallel fashion, wherein said control processing unit transmits a preparation request flag enabled state to said plurality of power supply processing units via said signal relay processing unit in order to instruct said plurality of power supply processing units to start preparation for driving said motor, said signal relay processing unit includes a preparation complete flag register for storing preparation complete flags each transmitted from each of said plurality of power supply processing units to indicate the completion of preparation for supplying power to said motor, and transmits a preparation complete flag enabled state to said control processing unit if it can be determined from the contents of said preparation complete flag register that the preparation is completed in all of said plurality of power supply processing units, and said control processing unit transmits a preparation request flag disabled state if said control processing unit does not receive said preparation complete flag enabled state from said signal relay processing unit within a predefined time after transmitting said preparation request flag enabled state, and wherein
upon receiving said preparation request flag disabled state from said control processing unit, said signal relay processing unit stops transmission of said preparation request flag disabled state to said plurality of power supply processing units, and thereby holds the contents of said preparation complete flag register in a state that existed just before the reception of said preparation request flag disabled state.

8. A motor control apparatus as claimed in claim 7, wherein the contents of said preparation complete flag register are held in said state until said signal relay processing unit receives a next preparation request flag enabled state from said control processing unit.

9. A motor control apparatus as claimed in claim 8, wherein the contents of said preparation complete flag register held in said state are reset upon said signal relay processing unit receiving a next preparation request flag from said control processing unit.

10. A motor control apparatus as claimed in claim 7, wherein the contents of said preparation complete flag register held in said state are reset upon said signal relay processing unit receiving a next preparation request flag from said control processing unit.

11. A motor control apparatus as claimed in claim 7, wherein the contents of said preparation complete flag register held in said state are transmitted from said signal relay processing unit to said control processing unit, thereby enabling said control processing unit to identify any power supply processing unit that failed to complete the preparation for supplying power to said motor.

12. A motor control apparatus as claimed in claim 11, wherein, upon identifying any power supply processing unit that failed to complete the preparation for supplying power to said motor, said control processing unit transmits an alarm along with information of said identification to outside of said apparatus.

* * * * *